N. P. Slade.
Check for Horse-Power.
No. 98,715.  Patented Jan. 11, 1870.
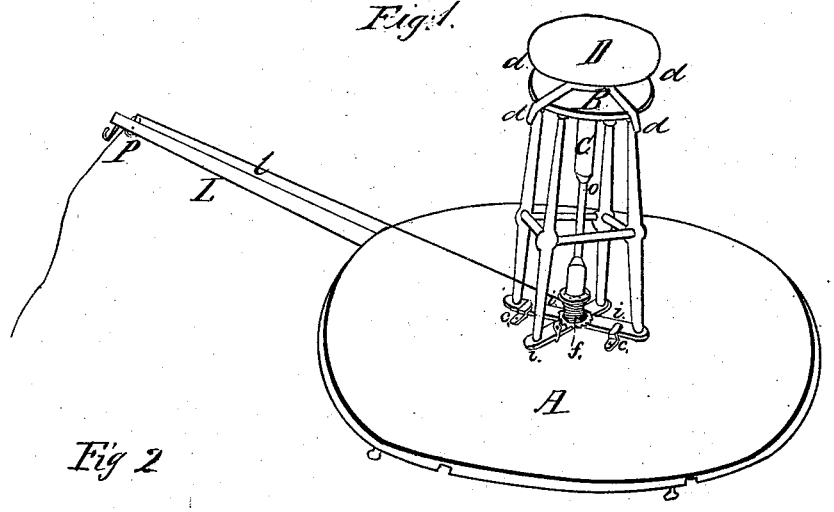
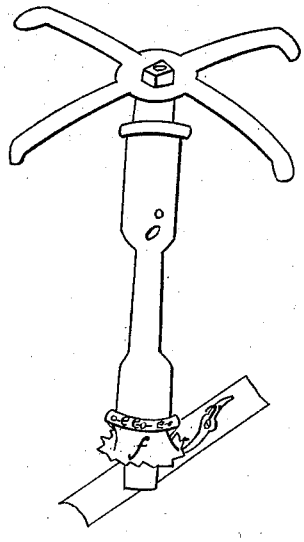
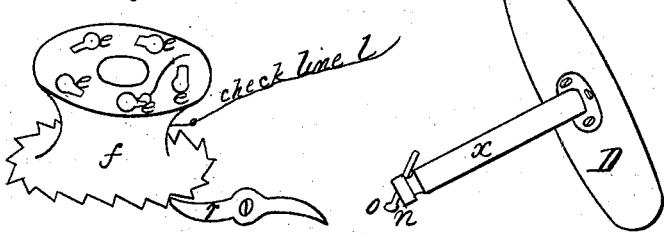
Witnesses:
H. C. Hunt
C. P. Miller
Inventor:
Norman P. Slade

United States Patent Office.

NORMAN P. SLADE, OF FRANKLIN GROVE, ILLINOIS.

Letters Patent No. 98,715, dated January 11, 1870; antedated January 5, 1870.

IMPROVED DEVICE FOR CONTROLLING HORSES.

The Schedule referred to in these Letters Patent and making part of the same.

To all whom it may concern:

Be it known that I, NORMAN P. SLADE, of Franklin Grove, in the county of Lee, and State of Illinois, have invented a new and useful Device for Controlling, Checking, or Stopping Horses while attached to the horse-power of threshing or other machinery; and I hereby declare that the following is a full, clear, and exact description of the same, reference being had to the accompanying drawings, which form a part of this specification.

Figure 1 is a perspective view, showing the combination and arrangement of the several parts when in working order.

Figure 2 represents the upright revolving shaft of the device detached from the stool, with the quadrupled check-lever attached to its upper end, and the spool or capstan (to which the check-lines are attached) connected with its lower end, which gives a perfect connection at all times between the driver and the teams.

Figure 3 is an enlarged view of the spool or capstan, showing on its upper surface the slotted holes in which the check-lines are fastened by means of knots, and at its lower periphery the pawl and ratchet, which secure safety, while working about the cylinder, by preventing the check-lines from unwinding, and allowing the teams to start incidentally.

Figure 4 represents the revolving seat detached from the upright shaft, (in which it turns,) and shows an annular groove in the lower extremity of the stool-spindle, which serves to keep the seat in position by means of a pin passing through the upright shaft and working in the said annular groove.

To enable those who are skilled in manufacture, the better to understand my invention, I will proceed to describe it more fully, as follows:

In fig. 1, A represents a table or platform, attached to the horse-power in any convenient and secure way.

B represents an upright frame or stool, which is secured to the platform A by two or more buttons or clasps, marked c, which embrace the cross-bars i, said cross-bars being permanently attached to the bottom of the legs of the frame B, which legs pass through the cross-bars i, and enter holes in the platform A, and prevent its turning independently of the said platform.

C represents the upright revolving check-shaft, shown more clearly in fig. 2.

d d d d, the quadruple check-lever.

f, the spool or capstan.

D, the driver's seat, which revolves with or independent of the stool or frame B, in a manner similar to a revolving desk-stool.

L represents the ordinary lever, to which the horses are attached with a pulley, p, in its outer end, and small.

l, the check-line, which leads from the bridle-bits around the pulley p, to the spool or capstan f, thus placing all the teams under the immediate control of the driver, which renders his position a comparatively safe one in case of the breaking of the machinery, or other accidents, which often occur, to the peril of life or limb.

In fig. 2, C represents an upright shaft, (made of wood or any suitable material,) the lower end of which has its bearing in the crossing of the cross-bars i, and its upper end revolves in the centre of the stool or frame B.

Above the top of the frame B, the shaft C is square, and to this square end is attached the quadruple check-lever d d d d, the said lever having four ends, at equal distances apart, so that one of them will always be in convenient reach of the driver; and to the lower end of the shaft C is attached the spool or capstan f. The said spool or capstan being made of iron, or any suitable material, has in its upper surface holes e, with short slots extending from them, in a line parallel with the periphery of the spool or capstan, as shown in fig. 3, and the check-lines are attached to the said spool or capstan in the same manner in which violin-strings are attached to the tail-piece of a violin.

On the lower periphery of the spool or capstan f, is a ratchet, in or with which the pawl r engages, (also shown in fig. 3.) The said pawl serves to prevent the check-lines l from slacking (in the absence of the driver,) by holding the spool or capstan f from revolving backward, thus securing safety to any one who may be at work about the cylinder, (fixing teeth or other parts,) by preventing the horses from starting up incidentally, as they are very apt to do, endangering life and limb.

In fig. 3, the holes e, with their slots, together with the pawl and ratchet, (which are on an enlarged scale,) have already been described, setting forth their uses and design clearly.

In fig. 4, D is the driver's seat, to which is attached an iron spindle or shaft, x. In the lower end of the spindle is an annular groove, shown at n. This spindle or shaft x rests in a hole or socket in the upper end of the upright check-shaft C, and a pin o, passes through the shaft C and the annular groove in the spindle or shaft x, and secures the seat firmly in position, and allows it to revolve freely, at the option of the driver. The seat D is sufficiently high above the stool or frame B, to allow the check-lever d d d d to work freely between them, and its four ends project far enough beyond the edge of the seat to enable the driver to grasp them readily.

The stool or frame B, together with the check-shaft C, check-lever $d\ d\ d\ d$, spool or capstan $f$, and seat D, may be readily removed from the platform A, (for loading or transportation-purposes,) by simply turning the buttons or clasps $c$, so as to release the cross-bars $i$.

The advantages of my invention are obvious: First, the driver is enabled, with it, to check the speed of his teams at his option, and, when he chooses, can stop them without leaving his seat or speaking to them; secondly, by a series of knots in the check-lines $l$, the teams can all be held even, and made to draw alike in a great measure; and last, though not least, while the driver is furnished with a good and comfortable seat, in case of accident he can stop his teams from pulling instantly, thereby, many times, saving life or the breaking of limbs, and further damage to machinery.

Having thus described my invention,

What I claim as new, and desire to secure by Letters Patent of the United States, is—

The combination of the check-cord $l$, or its equivalent, revolving shaft C, levers $d\ d\ d\ d$, and capstan $f$, with a horse-power, A, for the purpose of checking and controlling the horses attached to said power, at the option of the driver, substantially as shown and described.

NORMAN P. SLADE.

Witnesses:
F. D. WILLIAMSON,
CHAS. D. HART.